Aug. 4, 1936.　　　F. T. COPE　　　2,049,947
METHOD OF TESTING GAS
Filed Aug. 19, 1933　　2 Sheets-Sheet 1

Fig.1.

INVENTOR
Frank T. Cope

Aug. 4, 1936.　　　F. T. COPE　　　2,049,947
METHOD OF TESTING GAS
Filed Aug. 19, 1933　　2 Sheets-Sheet 2
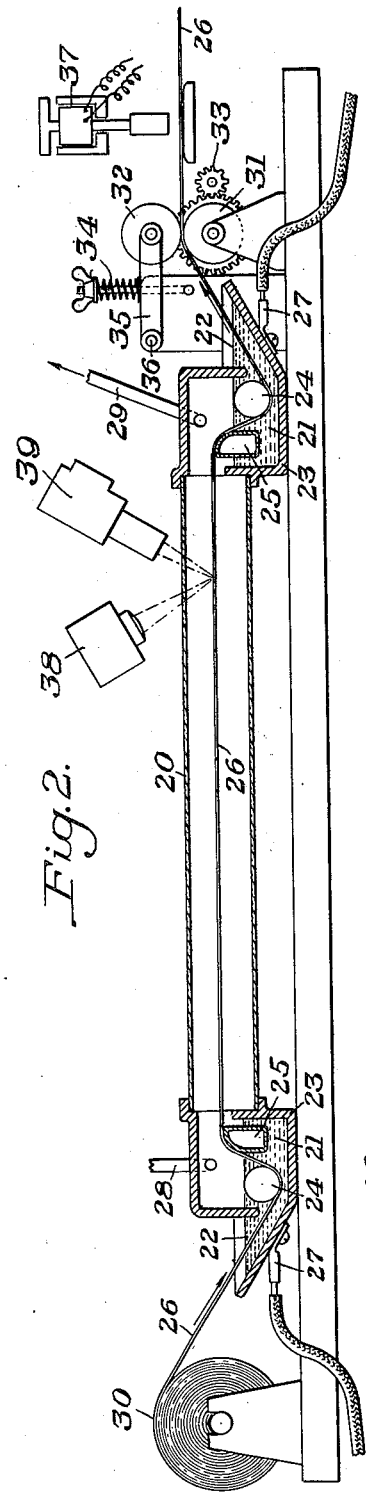
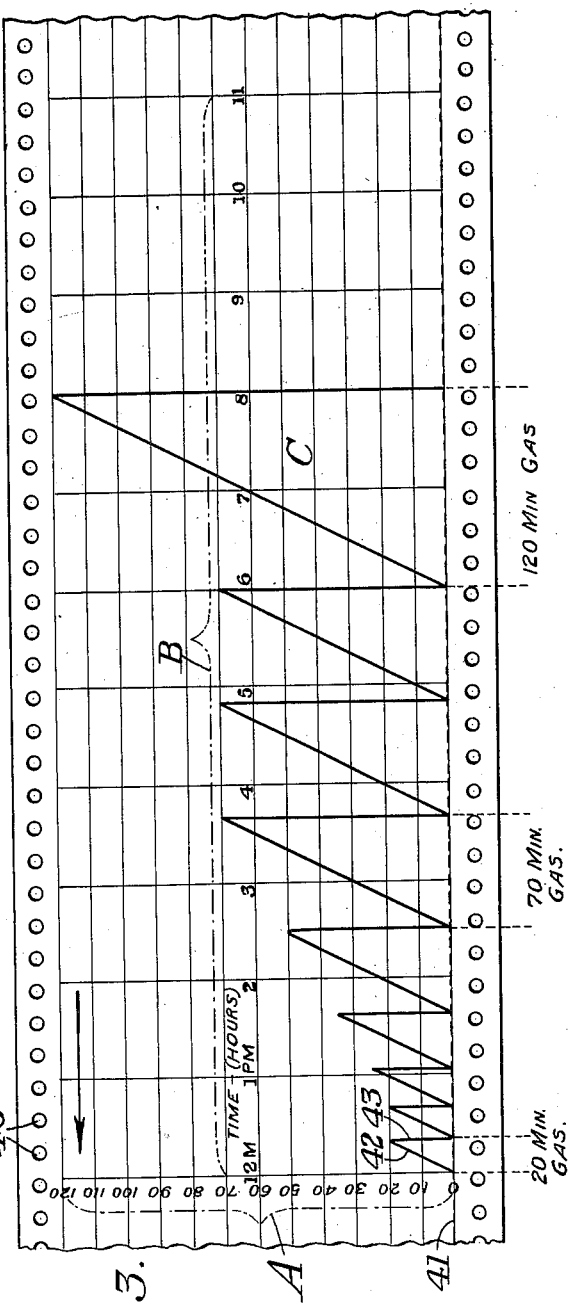
INVENTOR
Frank T. Cope
by his attys
Byrnes, Stebbins, Parmelee & Blenko Patented Aug. 4, 1936

2,049,947

UNITED STATES PATENT OFFICE 2,049,947

METHOD OF TESTING GAS

Frank T. Cope, Salem, Ohio, assignor to The Electric Furnace Company, Salem, Ohio, a corporation of Ohio Application August 19, 1933, Serial No. 685,887

13 Claims. (Cl. 23—232)

This invention relates generally to a method of testing gas which is to be used as a protective atmosphere in the heat treatment of metal. It relates more particularly to the method of testing the oxidizing effect of gas which is to be used as a protective atmosphere in the annealing of steel. Very small quantities of oxygen in the protective gas will produce discoloration in the steel during cooling through the critical discoloring range, particularly if the cooling through this range is slow. Protective gas, for example gas of the type produced according to the application of Wilbur S. Bowling, Serial No. 614,912, filed June 2, 1932, now Patent 1,979,820, issued November 6, 1934, contains hydrogen carbon monoxide, carbon dioxide, methane and nitrogen. It has been found that although the hydrogen and carbon monoxide are active reducing agents at high temperatures, and therefore protect the steel from oxidation by the oxygen at high temperatures, their activity as reducing agents ceases at a temperature between 1200° and 1000° F. When, therefore, steel is annealed in the protective atmosphere, it will discolor if it is cooled slowly through the discoloration range between 1000° and 400° F. since in this range the hydrogen and carbon monoxide of the protective gas are not active.

Where very thin strip is annealed and rapidly cooled through the critcal discoloring range, the discoloring effect is not so noticeable, but where handling gauges over approximately $\frac{1}{16}$″ in a continuous annealing furnace, or any gauges in pack annealing furnaces, the work tends to show a more or less discolored surface. I have found that as little as .015% oxygen by volume will produce a discoloration of steel when the steel is within the discoloring range only for as short a period as one minute. This small quantity of oxygen cannot be measured by the usual gas testing apparatus, in which any quantity under one-tenth of one percent can only be estimated. There is therefore a need of providing some method of testing protective gases containing very small quantities of oxygen so that the protective atmosphere may be regulated in composition to render it suitable in the annealing of metal. Such a method is provided by the present invention.

In the accompanying drawings, which illustrate two embodiments of my invention.

Figure 1 illustrates in a somewhat diagrammatic manner one form of apparatus suitable for carrying out the method;

Figure 2 is a similar view of another form of apparatus adapted for recording the quality of the gas; and Figure 3 illustrates a type of record chart indicating the quality of the gas.

Referring more particularly to the accompanying drawings, and for the present to Figure 1, the apparatus for testing the gas which is to be used as a protective atmosphere in the heat treatment of metal comprises a glass tube 2 sealed at its ends by rubber plugs 3. The glass tube is preferably of the "Pyrex" type so that it will withstand the temperatures employed. Inside of the tube is a steel strip 4. The strip is secured by clamps 5 to the inner ends of electric terminals 6 which extend out through the rubber plugs 3 and are connected by contacts 7 in circuit with a source of electric current. In the arrangement shown, the current is supplied through electric conductors 8 controlled by a switch 9 and a rheostat 10. A step-down transformer 11 is used for regulating the voltage delivered to the terminals 6 through conductors 12. An ammeter 13 is also provided.

The gas to be tested is led into the glass tube through an inlet 14 extending through one of the plugs 3, and after passing through the tube in contact with the metal strip, flows out of the tube through an outlet 15 extending through the other plug.

In testing a gas to determine its discoloring effect, a steel strip is clamped in position as shown, the gas is conducted through the tube and the strip is heated to the discoloring range by supplying current to the terminals 6. The rate of discoloring of the sample indicates the suitability of the gas for use as a protective atmosphere. In this embodiment of the invention, it is not necessary to regulate the current flow through the test strip with great exactness. There is considerable heat conduction away from the strip by the terminal rods and therefore if sufficient current is caused to flow to raise the center portion of the strip somewhat above the desired temperature, the conduction will cause the ends to be somewhat cooler and therefore the critical temperature will exist at some point between the center and ends.

The apparatus is simple and may be carried from place to place to test various gases. Quantities of oxygen in the gas which are too small to be determined by the usual gas testing apparatus may be tested in the arrangement described and the composition of the gas may, accordingly, be regulated so that it will decrease or eliminate the discoloring effects on the annealed material.

In Figure 2 there is shown another embodiment in which the sample strip of metal may be passed continuously or intermittently through a tube supplied with the gas which is to be tested. This arrangement is particularly adapted where it is desired to make a permanent record of the quality of the gas. A glass tube 20 is provided at each end with mercury seals 21, the level of the mercury being indicated by the reference numeral 22. In each of the metal troughs 23 which contain the mercury there is a guide roller 24 and a water or air cooled hollow shoe 25 which guide the strip 26 through the tube. Each of the troughs 23 has an electric terminal 27 which may be connected in a manner similar to that described in connection with the embodiment shown in Figure 1 so as to place the strip 26 in an electric circuit in order to heat it. The gas to be tested is admitted to the tube through an inlet pipe 28 and after passing through the tube in contact with the strip, it flows out through an outlet 29.

The strip 26 is fed from a reel 30. It passes in the direction indicated by the arrow through the two mercury seals and the tube and between driven pinch rollers 31 and 32 arranged at the exit end of the apparatus. The roller 31 is driven through gearing 33 by any suitable means. The pressure of the roller 32 on the strip may be regulated by a wing nut and spring 34 acting on an arm 35 which supports the roller 32 and is pivoted at 36. An electric time stamp 37 may be provided for stamping the strip after it has passed through the tube. When the time stamp is used with the continuously traveling strip, the strip itself forms the permanent record and is useful as such a record as long as it can be kept from tarnishing. The most important use of the strip as a record is to enable a superintendent to determine the history of a night's run or a run during the time when he was not present.

A photoelectric cell unit comprising a light source 38 and a cell 39 is placed adjacent the tube so that the strip passing therethrough may be scanned continuously. Suitable electrical connections and auxiliary devices for accomplishing my purpose are of the character illustrated in connection with other purposes in the patents to Gardiner, No. 1,774,433, dated August 26, 1930, and Sheldon, No. 1,834,905, dated December 1, 1931. The photoelectric cell may be calibrated so that it will actuate a signal, for example ring a bell or light a lamp, whenever the brightness of the strip falls below a certain value, or it may be made to actuate an indicator or recorder which gives an arbitrary reading of the condition of the strip. The construction of the photoelectric cell and the electrical connections between it and the signal device have not been shown since such arrangements are common and any suitable arrangement may be employed. For instance, the valve 6 of the construction shown in the Gardiner patent could be arranged to control the actuation of a signal, a recorder, or other desired device, instead of the diaphragm valve 4 as shown. Or the circuit arrangement shown in Fig. 4 of that patent could be so arranged.

The strip may be fed continuously through the tube at a slow rate of speed, say, from 1 to 12 inches per hour, and while heated to the discoloring range, be scanned continuously by the photoelectric cell. When the brightness of the strip falls below a certain value it may operate a signal as described.

The preferred method of operating the testing apparatus is as follows: The strip is fed from the reel into the tube to the position shown in Figure 2 and the strip is maintained stationary. Electric current is supplied to the strip to heat it to the discoloring range and the gas to be tested is continuously flowed through the tube. The photoelectric cell is focused on the strip and connected to suitable control mechanism for operating a recording chart. Figure 3 illustrates a chart of the type which may be used in connection with the gas testing apparatus. It comprises a strip of paper having perforations 40 extending along the edges and adapted to cooperate with suitable mechanism for moving the paper to the left, as indicated by the arrow. The chart is provided with a transverse scale A representing the time required for the sample to reach the standard shade of discoloration, and a longitudinal scale B representing the time of day or night. The recording instrument has a tracing pen which moves across the chart as the chart moves forward. The instrument is adjusted so that the pen will be at the zero line 41 at the beginning of the test. The pen moves across the chart as the chart moves forward, forming a line 42, the length of which will depend upon the time required for the strip of metal to reach the standard shade of discoloration. When the standard shade of discoloration has been reached, the pen is automatically returned to the zero line. It will be seen therefore that the goodness of the gas is represented by the height of the line 43 and this height may be measured on the vertical scale A. The chart shows that the gas fed through the testing apparatus at first required 20 minutes to produce the standard degree of discoloration in the steel sheet. The composition of the gas was then adjusted so as to decrease the oxygen content which gradually increased the period of time required to produce the standard degree of discoloration until at the point marked C on the chart, it required 120 minutes to discolor the strip of steel to the standard shade.

After one test has been made and the pen on the record chart has been returned to the zero position by the photoelectric cell, the strip 26 is moved forward a distance equal to the space between the contact shoes 25 so as to place a fresh steel sample in position to be scanned by the photoelectric cell. The operation is then repeated and the results of the test are recorded on the chart.

In carrying out the tests, a constant known rate of gas flow is maintained through the tube and about the heated steel strip sample. This can be done by metering the gas through an orifice or by any other well known method. The sample strip should have a uniform character of surface so that its light reflecting properties do not vary greatly. If necessary, the strip may be given a preliminary polish in order to insure that it will have a surface of uniform light reflecting properties.

The apparatus shown in Figure 1 is used primarily for visual observation of the strip, but if desired, a photoelectric cell might be provided with this apparatus, the cell being used to determine the amount of time required to produce the standard degree of discoloration, instead of depending upon visual observation for this purpose. The arrangement shown in Figure 2 can be used either with or without the photoelectric cell and the strip may be moved either continuously or intermittently through the tube 20. In this arrangement a metal walled enclosure, such as a tube, provided with windows through which the light beam passes may be used in place of the glass tube.

The sample strip 4 or 26 is not necessarily of the same metal as that which is to be heat treated in the gas. In cases where steel is being treated, the sample strip is preferably steel, but in any case where a delicate test is desirable, a steel sample strip will be used. When it is only desired to know whether the gas is suitable for a certain treatment, for instance in the annealing of copper, a strip of the metal in question may be used. However, copper can be annealed with entire success in a gas containing apreciable amounts of oxygen and so the use of a copper test strip will not give a sensitive test.

Either form of apparatus may be used not only for testing the gas which is to be supplied to a furnace, but may be employed for testing the gas taken from any portion of the heat treating furnace or cooling hood. In this manner, infiltration of air to the heat treating furnace can be detected instantly.

I have illustrated and described two embodiments of the apparatus and have described certain ways of carrying out the process. It will be understood, however, that the invention may be otherwise embodied or practiced within the scope of the following claims.

I claim:

1. The method of testing gas for use as a protective atmosphere in the heat treatment of metal, which comprises heating a sample of steel to a temperature between 1200° F. and 400° F. in said gas by passing an electric current through said sample, visually observing the progress of discoloration during the heating, and adjusting the composition of the gas to avoid discoloration of the sample.

2. The method of testing gas for use as a protective atmosphere in the heat treatment of metal, which comprises heating a sample of said metal to a temperature between 1200° F. and 400° F. in said gas by passing on electric current through said sample, observing the time required to produce a standard degree of discoloration in the sample, and adjusting the composition of the gas to avoid discoloration of the sample.

3. The method of testing gas for use as a protective atmosphere in the heat treatment of metal, which comprises passing a strip of metal heated to the discoloring range through said gas, visually observing the progress of discoloration during the treatment, and adjusting the composition of the gas to avoid discoloration of the sample.

4. The method of testing gas for use as a protective atmosphere in the heat treatment of metal, which comprises moving a strip of metal heated to the discoloring range in contact with a stream of said gas, visually observing the progress of discoloration during the treatment, and adjusting the composition of the gas to avoid discoloration of the sample.

5. The method of testing gas for use as a protective atmosphere in the heat treatment of metal, which comprises subjecting a moving strip of said metal heated to the discoloring range to a stream of said gas, continuously scanning the strip with a photoelectric cell, and utilizing said cell for operating an indicator of the quality of the gas.

6. The method of testing gas for use as a protective atmosphere in the heat treatment of metal, which comprises subjecting a stationary strip of metal heated to a temperature between 1200° F. and 400° F. to a stream of said gas, continuously scanning the strip with a photo-electric cell, and utilizing said cell for operating a recording instrument which records the time required to produce a standard degree of discoloration of the strip.

7. The method of testing gas adapted for use as a protective atmosphere in the heat treatment of metal to determine the presence of a suspected impurity in the gas, which comprises passing an electric current through a sample of metal to heat it to the discoloring range in said gas, said sample being subject to discoloration when heated to the discoloring range in contact with the suspected impurity, visually observing the progress of discoloration during the treatment, and adjusting the composition of the gas to avoid discoloration of the sample.

8. The method of testing gas for use as a protective atmosphere in the heat treatment of metal, which comprises heating a sample of steel to a temperature between 1200° F. and 400° F. in said gas, observing the progress of discoloration during the treatment, and adjusting the composition of the gas to avoid discoloration of the sample.

9. The method of testing gas adapted for use as a protective atmosphere in the heat treatment of metal to determine the presence of a suspected impurity in the gas, which comprises heating a sample of metal to between 1200° F. and 400° F. in said gas by passing an electric current through the sample, said sample being of a character such that it discolors when heated to such range in the presence of the impurity, observing the progress of discoloration during the treatment, and adjusting the composition of the gas to avoid discoloration of the sample.

10. The method of testing gas for use as a protective atmosphere in the heat treatment of metal, which comprises moving a strip of metal heated to a temperature between 1200° F and 400° F. in contact with a stream of said gas, observing the progress of discoloration during the treatment, and adjusting the composition of the gas to avoid discoloration of the sample.

11. The method of testing gas adapted for use as a protective atmosphere in the heat treatment of metal to determine the presence of a suspected impurity in the gas, which comprises heating a sample of metal to a temperature between 1200° F. and 400° F. in a chamber sealed from the atmosphere, and while the sample is maintained within such range maintaining a constant known rate of gas flow through the chamber in contact with the sample, observing the progress of discoloration during the treatment, and adjusting the composition of the gas to avoid discoloration of the sample.

12. The method of testing gas adapted for use as a protective atmosphere in the heat treatment of metal to determine the presence of a suspected impurity in the gas, which comprises heating in a chamber sealed from the atmosphere a sample of metal to a temperature below the maximum temperature required to anneal the sample and within its discoloring range on cooling, and while the sample is maintained within the discoloring range maintaining a constant known rate of gas flow through the chamber in contact with the sample, observing the progress of discoloration during the treatment, and adjusting the composition of the gas to avoid discoloration of the sample.

13. A method of testing gas which is to be used as a protective atmosphere in the heat treatment of metal, which comprises sampling the gas to be tested, heating a test piece of metal to its discoloring range and subjecting the heated test piece to the sample gas while within said discoloring range so that the presence of an impurity in the sample gas is indicated by the formation of a colored film or coating on the surface of the test piece.

FRANK T. COPE.